(12) United States Patent
Kanda et al.

(10) Patent No.: US 6,993,992 B2
(45) Date of Patent: Feb. 7, 2006

(54) BALL SCREW

(75) Inventors: Toru Kanda, Gunma (JP); Daisuke Maruyama, Gunma (JP); Hitoshi Sannomiya, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/608,739

(22) Filed: Jun. 30, 2003

(65) Prior Publication Data

US 2003/0233898 A1 Dec. 25, 2003

Related U.S. Application Data

(62) Division of application No. 10/062,412, filed on Feb. 5, 2002, now Pat. No. 6,722,223.

(30) Foreign Application Priority Data

Feb. 6, 2001 (JP) .......................... P. 2001-029102

(51) Int. Cl.
  *F16H 25/22* (2006.01)
(52) U.S. Cl. ............................... 74/424.88; 74/424.82; 74/424.86
(58) Field of Classification Search ............. 74/424.82, 74/424.81, 424.83, 424.86, 424.87, 424.88
  See application file for complete search history.

(56) References Cited

U.S. PATENT DOCUMENTS

| | | | | |
|---|---|---|---|---|
| 3,053,105 A | * | 9/1962 | Cole ........................ | 74/424.86 |
| 6,149,307 A | * | 11/2000 | Kamimura et al. ........... | 384/49 |
| 6,347,558 B1 | * | 2/2002 | Miyaguchi et al. ...... | 74/424.71 |
| 2002/0139209 A1 | * | 10/2002 | Takagi et al. ............ | 74/424.82 |

FOREIGN PATENT DOCUMENTS

DE   199 25 040 A1   12/1999

* cited by examiner

Primary Examiner—William C. Joyce
(74) Attorney, Agent, or Firm—Sughrue Mion, PLLC

(57) ABSTRACT

A ball screw which is little subject to deterioration of operating characteristics and occurrence of wear, torque change, noise, vibration, etc. during operation due to stagnation or competition of balls. The ball screw includes a screw shaft having a helical thread groove formed on the outer surface thereof and a nut having a thread groove formed on the inner surface thereof corresponding to the thread groove on the screw shaft which engages with the screw shaft with the interposition of a number of balls rollably provided in a helical ball rolling path formed between the two thread grooves, and spacers between adjacent ones of the number of balls, wherein the variation of the total of the gap between the balls and spacers during the rolling of the balls is smaller than $\frac{1}{20}$ of the diameter of the ball.

4 Claims, 2 Drawing Sheets

BALL SCREW

This is a divisional of application Ser. No. 10/062,412 filed Feb. 5, 2002; now U.S. Pat. No. 6,722,223 the disclosure of which is incorporated herein by reference.

BACKGROUND OF THE INVENTION

The present invention relates to a ball screw. More particularly, the invention relates to a ball screw which is little subject to deterioration of operating characteristics and occurrence of wear, torque change, noise, vibration, etc. due to stagnation or competition of balls.

A ball screw comprises a screw shaft and a nut. An outer surface of the screw shaft and an inner surface of the nut are provided with the respective helical thread grooves corresponding to and confronting with each other. The helical space formed between the two thread grooves, i.e., ball rolling path is filled with a number of balls while allowing the balls to rotate. In this arrangement, the screw shaft and the nut make a relative helical movement with the rolling, of these balls to make a relative movement in the axial direction.

Such a ball screw has a gap formed between the adjacent balls. As the balls roll, the total of all the gaps in one circuit varies with every movement of one ball.

In particular, a ball screw for use in injection molding machine or the like, i.e., ball screw comprising balls having a diameter relatively greater than the diameter of the shaft and hence having a relatively great scooping angle tends to have a great variation of the total of gaps (value obtained by totaling the gaps between the balls over the entire ball screw).

Thus, a ball screw which varies greatly in the total of gaps between balls is subject to deterioration of operating characteristics and occurrence of wear, torque change, noise (noise of ball slipping), vibration, etc. during the rolling of balls (during the operation of ball screw) due to stagnation or competition of balls to disadvantage.

SUMMARY OF THE INVENTION

It is therefore an object of the invention to provide a ball screw which is little subject to deterioration of operating characteristics and occurrence of wear, torque change, noise, vibration, etc. during operation due to stagnation or competition of balls.

The foregoing object of the invention will become apparent from the following detailed description and examples.

The foregoing object of the invention can be accomplished with the following constitution. A ball screw, according to the present invention, comprises a screw shaft, a nut and a number of balls. The screw shaft has a helical thread groove formed on the outer surface thereof. The nut has a thread groove formed on the inner surface thereof corresponding to the thread groove on the screw shaft which engages with the screw shaft with the interposition of the balls rollably provided in a helical ball rolling path formed between the two thread grooves. In the ball screw, the variation of the total of the gaps between the balls during the rolling of the balls is smaller than $\frac{1}{20}$ of the diameter of the ball.

In this arrangement, the ball screw is little subject to deterioration of operating characteristics and occurrence of wear, torque change, noise, vibration, etc. during operation due to stagnation or competition of balls. The ball screw is also little subject to wear or damage on the constituent members such as ball.

The invention can be applied also to a ball screw comprising a spacer for retaining a ball provided interposed between balls. In this case, the variation of the total of the gap between the spacers and the balls during the rolling of the balls is predetermined to be smaller than $\frac{1}{20}$ of the diameter of the ball.

Such a ball screw can exert an effect of preventing the spacer from falling down in the ball rolling path or an effect of preventing the spacer from being damaged besides the foregoing effect.

BRIEF DESCRIPTION OF THE DRAWING

By way of example and to make the description more clear, reference is made to the accompanying drawing in which.

DETAILED DESCRIPTION OF THE INVENTION

Figure 1:
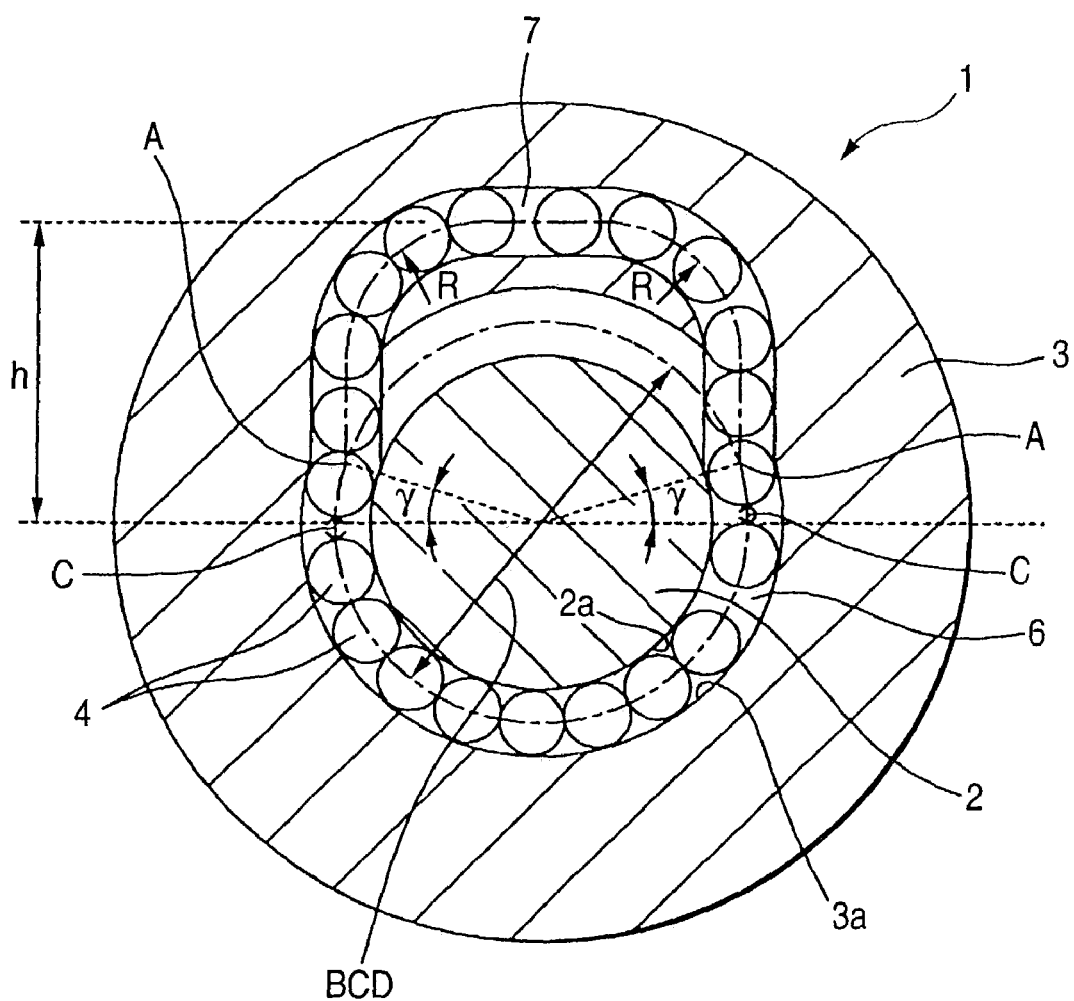
FIG. 1 is a sectional view illustrating an embodiment of the ball screw according to the invention.
Figure 2:
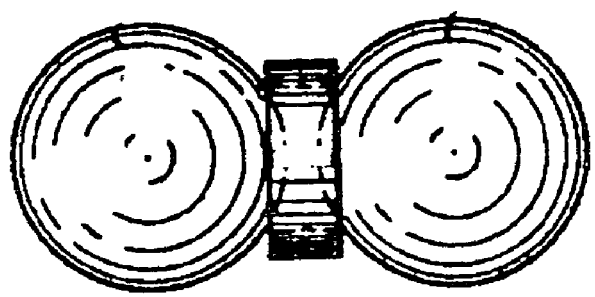
FIG. 2 is a schematic illustration of two adjacent balls with a spacer disposed therebetween.

An embodiment of the ball screw according to the invention will be described hereinafter in connection with the sectional view of FIG. 1.

A ball screw 1 comprises a screw shaft 2, a cylindrical nut 3, and a number of balls 4. The screw shaft 2 has a helical thread groove 2a having an arc section formed on the outer surface thereof. The cylindrical nut 3 has a helical thread groove 3a having an arc section corresponding to the thread groove 2a on the screw shaft 2 formed on the inner surface thereof which engages with the screw shaft 2. The number of balls 4 which are rollably provided in a helical ball rolling path 6 having a substantially circular section formed between the thread groove 2a on the screw shaft 2 and the thread groove 3a on the nut 3.

The nut 3 comprises a U-shaped ball circulating path 7 through which the balls 4 circulate from the ball rolling path 6 to the ball rolling path 6. In some detail, the balls which are rolling and moving through the ball rolling path 6 until they revolve round the screw shaft 2 along the thread groove 2a by a plurality of turns, and then taken up by the ball circulating path 7 at one end thereof from which they move through the ball circulating path 7 back to the ball rolling path 6 at the other. This operation is then repeated.

The nut 3 which engages with the screw shaft 2 with the interposition of the balls 4 and the screw shaft 2 make a relative helical movement with the rolling of the balls 4 to make a relative movement in the axial direction.

The sectional shape of the thread grooves 2a and 3a may be a Gothic arch, i.e., substantially V formed by combining two arches having different centers of curvature.

The balls 4 which are rolling and moving through the ball rolling path 6 and the ball circulating path 7 have a gap C formed therebetween, as shown in FIG. 1. The total of the gaps C varies with the rolling of the balls 4. The variation of the total of the gaps C occurs due to the change of the number of the balls 4 present in the respective sections of path.

The variation of the total of the gaps C can be adjusted by designed value of the height h of the ball circulating path 7 from the center of the screw shaft 2, the scooping angle γ of the ball 4 and the radius R of curvature of the bent portion of the ball circulating path 7 (see FIG. 1). The adjustment of the variation of the total of the gaps C can be accomplished by predetermining the inner diameter of the ball circulating path 7 so that the balls 4 are arranged with a staggered manner in the ball circulating path 7.

The invention will be further described in the following examples, but the invention should not be construed as being limited thereto.

The ball screw 1 was evaluated for the variation of the total of gaps C between the balls 4 in a row of circuit (Balls were arranged geometrically in a row of circuit on a computer. The total of gaps C was then calculated. The arrangement of these balls was then changed. The total of gaps C was then calculated. This operation was repeated to determine the variation of the total of gaps C.). The results of evaluation on the ball screw 1 was then compared with that of a conventional ball screw.

The various dimensions and the variation of the total of gaps C of Example (ball screw 1) and the conventional ball screw are shown in FIG. 1.

TABLE 1

|  | Example | Conventional |
| --- | --- | --- |
| h (mm) | 93.9 | 94.9 |
| γ (°) | 30 | 36 |
| R (mm) | 40.9 | 35.9 |
| Variation of total gap (mm) | 0.32 | 1.17 |

The ball screw of Example and the conventional ball screw are the same in dimensions other than h, γ and R as follows:

Diameter of screw shaft: 120 mm
Ball center diameter (BCD): 123 mm
Lead: 20 mm
Diameter of ball: 15.875 mm (⅝ inch.)
Number of circuits: 2.5 turns×4 rows As can be seen in Table 1, the ball screw 1 of Example, h, γ and R of which are designed as set forth in Table 1, showed a variation of total gap as small as 0.32 mm, which is smaller than 1/20 of the diameter of ball (approx. 0.79 mm). As a result, the ball screw 1 of Example was little subject to deterioration of operating characteristics and occurrence of wear, torque change, noise, vibration, etc. during operation due to stagnation or competition of balls.

On the contrary, the conventional ball screw showed a variation of total gap as great as 1.17 mm and thus was subject to deterioration of operating characteristics and occurrence of wear, torque change, noise, vibration, etc. during operation due to stagnation or competition of balls.

The present embodiment merely illustrates an example of the invention and doesn't restrict the invention.

For example, the various dimensions of the ball screw 1 and the shape of the ball circulating path 7 may be properly modified so far as the object of the invention cannot be impaired (For example, in order to adjust the variation of the total of gaps C, the inner diameter of the ball circulating path 7 may be predetermined to be greater,than the diameter of the ball 4 so that the balls 4 are arranged with a staggered manner in the ball circulating path 7). The ball circulating system is not limited to the return tube system as used in the present embodiment but may be an end cap system, a circulating top system, a guide plate system or the like. Further, the invention can be applied to a ball screw comprising a spacer for retaining a ball provided interposed between the balls.

As mentioned above, the ball screw according to the invention is little subject to deterioration of operating characteristics and occurrence of wear, torque change, noise, vibration, etc. during operation due to stagnation or competition of balls.

While the invention has been described in detail and with reference to specific embodiments thereof, it will be apparent to one skilled in the art that various changes and modifications can be made therein without departing from the spirit and scope thereof.

What is claimed is:

1. A ball screw comprising:
   a number of balls;
   a screw shaft having a helical thread groove formed on an outer surface thereof;
   a nut having a thread groove formed on an inner surface thereof corresponding to the thread groove on said screw shaft which engages with said screw shaft with the interposition of the number of balls rollably provided for retaining the balls interposed therebetween in a helical ball rolling path formed between said two thread grooves; and
   spacers disposed between adjacent ones of said number of balls,
   wherein a variation of the total of gaps between said balls and said spacers during the rolling of said balls is smaller than 1/20 of the diameter of said ball.

2. The ball screw according to claim 1, wherein the variation of the total of gaps is adjusted by at least one of designed values of
   a height of the ball circulating path from the center of the screw shaft,
   a scooping angle of the ball, and
   a radius of curvature of a bent portion of the ball circulating path.

3. The ball screw according to claim 1, wherein said nut is provided with a ball circulating path that has an inner diameter slightly larger than the outer diameter of the ball.

4. The ball screw according to claim 3, wherein said ball circulating path comprises a return tube.

* * * * *